United States Patent
Cho et al.

(10) Patent No.: US 9,245,185 B2
(45) Date of Patent: Jan. 26, 2016

(54) TERMINAL FOR GENERATING AUGMENTED REALITY AND METHOD THEREOF

(71) Applicant: Samsung Electronics Co., Ltd., Suwon-si, Gyeonggi-do (KR)

(72) Inventors: Kyu-Sung Cho, Suwon-si (KR); Dae-Kyu Shin, Suwon-si (KR); Ik-Hwan Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 14/095,205

(22) Filed: Dec. 3, 2013

(65) Prior Publication Data

US 2014/0152853 A1 Jun. 5, 2014

(30) Foreign Application Priority Data

Dec. 3, 2012 (KR) ........................ 10-2012-0138774

(51) Int. Cl.
*G06K 9/00* (2006.01)
*G06T 19/00* (2011.01)
*G09G 5/00* (2006.01)

(52) U.S. Cl.
CPC .................................. *G06K 9/00671* (2013.01)

(58) Field of Classification Search
CPC ....... G06K 9/00671; G06K 9/00664–9/00704; G06T 2215/16; G06T 19/006; H04N 2201/3245; G06F 3/011–3/015

USPC ............. 348/239, 222.1, 143, 211.99, 207.1; 345/633, 632; 463/31, 34; 725/105; 382/254

See application file for complete search history.

(56) References Cited

U.S. PATENT DOCUMENTS

| | | | |
|---|---|---|---|
| 5,682,332 A | 10/1997 | Ellenby et al. | |
| 6,031,545 A * | 2/2000 | Ellenby et al. | ................ 345/632 |
| 8,400,548 B2 * | 3/2013 | Bilbrey et al. | ........... 348/333.01 |
| 8,477,149 B2 * | 7/2013 | Beato | ................... G06K 9/4652 |
| | | | 345/592 |
| 2006/0038833 A1 * | 2/2006 | Mallinson et al. | ............ 345/633 |
| 2007/0236514 A1 * | 10/2007 | Agusanto | ........... A61B 1/00193 |
| | | | 345/646 |
| 2010/0257252 A1 * | 10/2010 | Dougherty et al. | ........... 709/217 |
| 2012/0038670 A1 * | 2/2012 | Choi | ..................... G06T 19/006 |
| | | | 345/633 |
| 2013/0088514 A1 * | 4/2013 | Breuss-Schneeweis et al. | ............................. 345/633 |
| 2013/0198176 A1 * | 8/2013 | Kim | ............................. 707/724 |
| 2014/0247281 A1 * | 9/2014 | Ellenby | ................ G06T 19/006 |
| | | | 345/633 |

\* cited by examiner

*Primary Examiner* — Tuan Ho
*Assistant Examiner* — Marly Camargo
(74) *Attorney, Agent, or Firm* — Jefferson IP Law, LLP

(57) ABSTRACT

A terminal for generating an augmented reality and a method thereof are provided. The terminal includes a camera property information providing server configured to store camera property information associated with one or more cameras, and the terminal is configured to receive, from the camera property information providing server, camera property information associated with a camera included in the terminal and generate an augmented reality based on the stored camera property information when an augmented reality-based application is driven and thus, may provide an augmented reality in which a virtual object is accurately matched to an image.

17 Claims, 3 Drawing Sheets

TERMINAL FOR GENERATING AUGMENTED REALITY AND METHOD THEREOF

CROSS-REFERENCE TO RELATED APPLICATION(S)

This application claims the benefit under 35 U.S.C. §119(a) of a Korean patent application filed on Dec. 3, 2012 in the Korean Intellectual Property Office and assigned Serial No. 10-2012-0138774, the entire disclosure of which is hereby incorporated by reference.

TECHNICAL FIELD

The present disclosure relates to a terminal for generating an augmented reality and a method thereof. More particularly, the present disclosure relates to a terminal for generating an augmented reality in which an image and a virtual object are accurately matched when the terminal generates an augmented reality, and a method thereof.

BACKGROUND

In general, a foreside or a back side of a current terminal is equipped with a camera. When the terminal executes an augmented reality application, the terminal receives an image input by a camera disposed on the back side, and determines a position and a direction of the terminal by detecting or analyzing the input image. Subsequently, the terminal determines a position of interest or an object to be displayed based on the determined position and direction of the terminal, generates a virtual object, and composes the generated virtual object and the input image, for displaying. Here, the terminal may compose the generated virtual object and the input image based on the camera property information, and the camera property information includes a field of view, focal length, and the like of a camera.

As described above, a terminal of the related art determines a position and a direction of the terminal based on an image obtained from a camera, determines a position of interest and an object to be displayed based on the determined position and direction, and generates a virtual object.

However, various types of terminals of the related art are equipped with various types of cameras and thus, it is difficult to know camera property information of all terminals.

In addition, an augmented reality has been generated using common camera property information obtained by generalizing camera property information of all terminals and thus, there is a drawback in that an input image and a virtual object are not accurately matched.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a terminal for generating an augmented reality in which an input image and a virtual object are accurately matched, and a method thereof.

In accordance with another aspect of the present disclosure, a terminal for generating an augmented reality is provided. The terminal includes a sensor configured to detect a position or a direction associated with the terminal, a camera unit configured to output an image, a terminal posture estimator configured to estimate a posture of the terminal based on the position and the direction associated with the terminal detected by the sensor, a virtual object composition unit configured to compose a virtual object and the image input by the camera unit, and a controller configured to determine whether camera property information is stored when generating an augmented reality is requested, to request camera property information of the terminal from a camera property information providing server when the camera property information is not stored, and to compose the virtual object and the image based on the camera property information and the estimated posture when the requested camera property information is received.

In accordance with another aspect of the present disclosure, a method of generating an augmented reality in a terminal is provided. The method includes detecting a position or a direction associated with the terminal when generating an augmented reality is requested, estimating a posture of the terminal based on the position and the direction associated with the terminal detected by a sensor, determining whether camera property information is stored, requesting the camera property information of the terminal from a camera property information providing server when the camera property information is not stored, and composing a virtual object and an image based on received camera property information and the estimated posture when the requested camera property information is received.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
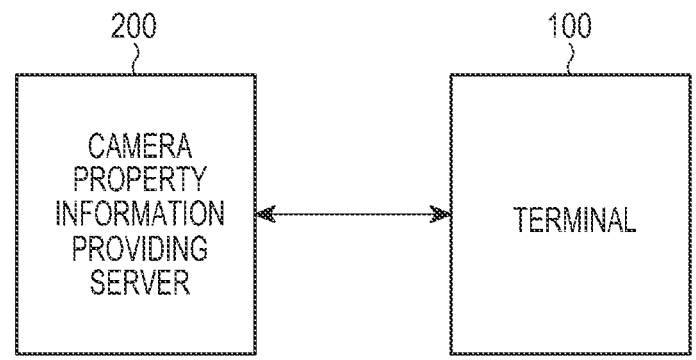
FIG. 1 is a diagram illustrating a system for generating an augmented reality according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In addition, terms, such as first, second, or the like, may be used herein when describing various components of the present disclosure. Each of these terminologies is not used to define a corresponding component but used merely to distinguish the corresponding component from other component(s). For example, a first component element may be referred to as a second component element, and similarly, the second component element may be referred to as the first component element without departing the scope and sprit of the disclosure. As used herein, terms are used merely for describing specific embodiments and are not intended to limit the present disclosure. The singular terms cover plural components unless the singular terms have different meaning contextually.

The present disclosure includes a camera property information providing server configured to store camera property information associated with one of more cameras, and a terminal configured to receive camera property information associated with a camera of the terminal from the camera property information providing server, store the received camera property information, and generate an augmented reality based on the stored camera property information and thus, may provide an augmented reality in which an image and a virtual object are accurately matched.

FIG. 1 illustrates a system for generating an augmented reality according to an embodiment of the present disclosure.

Referring to FIG. 1, the system for generating an augmented reality includes a terminal 100 and a camera property information providing server 200. Although the present disclosure exemplifies that a single terminal generates an augmented reality, an augmented reality may also be generated in one or more terminals.

When an augmented reality-based application is executed, the terminal 100 determines whether camera property information associated with a camera included in the terminal 100 is stored, and generates an augmented reality based on stored camera property information when the camera property information is stored.

The camera property information providing server 200 stores the camera property information associated with one or more terminals. In this example, the camera property information includes at least one of a field of view in which a camera views the world and a focal length from a lens to a camera sensor. In addition, the camera property information may further include an aspect ratio associated with a pixel of the camera sensor, a skewness associated with a pixel of the camera sensor, a pixel coordinate of a center point of the camera sensor (a principal point), and a parameter for correcting spherical distortion (distortion coefficient). In addition, the camera property information may further include resolution information used in a camera.

Figure 2:
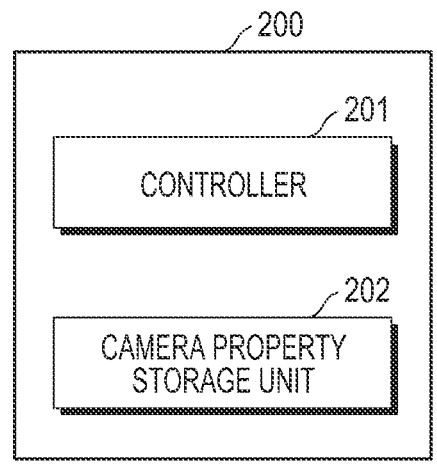
FIG. 2 is a diagram illustrating a camera property information providing server according to an embodiment of the present disclosure.

FIG. 2 is a diagram illustrating a camera property information providing server according to an embodiment of the present disclosure.

Referring to FIG. 2, the camera property information providing server 200 includes a controller 201 and a camera property storage unit 202.

The controller 201 may control general operations of the camera property information providing server 200. When a request message that requests camera property information associated with the terminal 100 is received from the terminal 100, the controller 201 searches for camera property information corresponding to a camera property search keyword included in the request message from among one or more pieces of camera property information included in the camera property storage unit 202.

When the camera property information corresponding to the camera property search keyword exists, the controller 201 generates a response message including the corresponding camera property information, and transfers the generated response message to the terminal 100.

When the camera property information corresponding to the camera property search keyword does not exist, the controller 201 generates a response message including information indicating that the corresponding camera property information does not exist, and transfers the generated response message to the terminal 100. According to another embodiment, the controller 201 generates a response message including common camera property information obtained by generalizing camera property information of all terminals, and transfers the generated response message to the terminal 100.

The camera property storage unit 202 stores camera property information corresponding to one or more terminals or cameras. For example, the camera property storage unit 202 stores at least one of one or more camera property search keywords, such as a type of terminal or a type of camera, a field of view in which a camera views the world, and a focal length from a lens to a camera sensor. In addition, the camera property storage unit 202 may further include an aspect ratio associated with a pixel of the camera sensor, a skewness associated with a pixel of the camera sensor, a pixel coordinate of a center point of the camera sensor (a principal point), and a parameter for correcting spherical distortion (distortion coefficient). In addition, the camera property storage unit 202 may further store common camera property information obtained by generalizing camera property information of all terminals.

Figure 3:
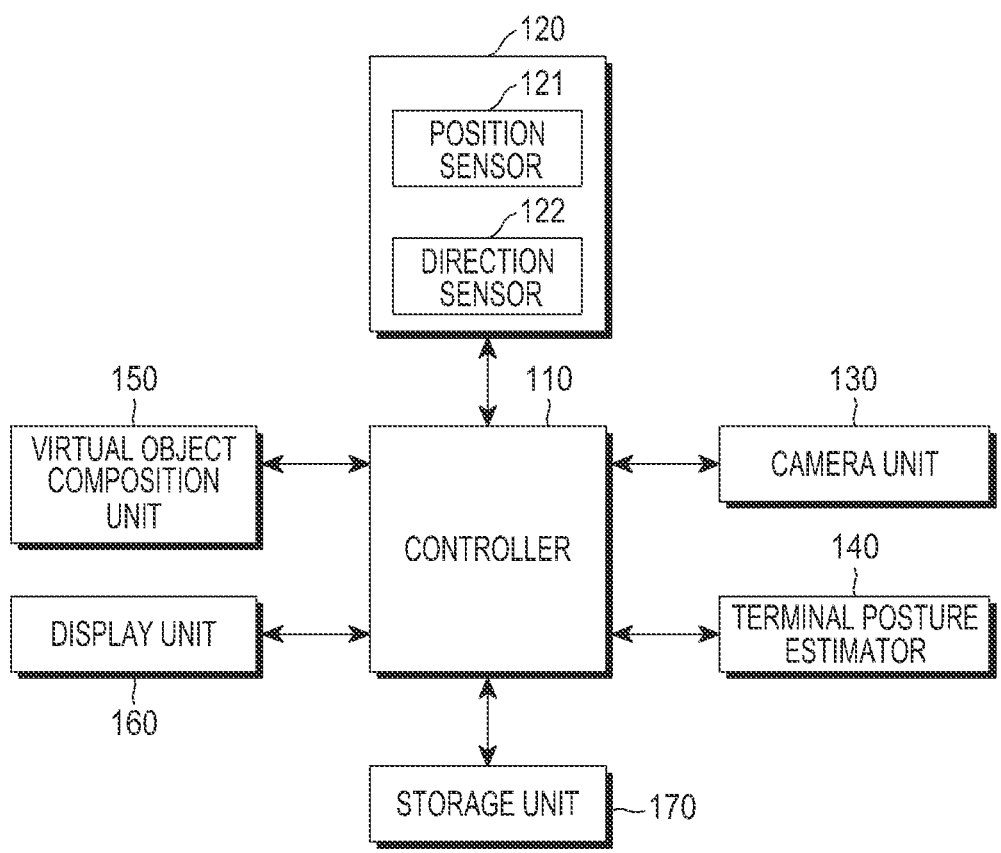
FIG. 3 is a diagram illustrating a terminal for generating an augmented reality according to an embodiment of the present disclosure.

FIG. 3 is a diagram illustrating a terminal for generating an augmented reality according to an embodiment of the present disclosure.

Referring to FIG. 3, the terminal 100 includes a controller 110, a sensor unit 120, a camera unit 130, a terminal posture estimator 140, a virtual object composition unit 150, a display unit 160, and a storage unit 170.

The controller 110 controls general operations of the terminal 100, and particularly, the controller 110 determines whether camera property information associated with the camera unit 130 is stored in the storage unit 170 when an augmented reality-based application is executed.

When the camera property information is stored, the controller 110 generates an augmented reality based on the stored camera property information. More particularly, the controller 110 determines a position and a direction of the terminal 100 based on the stored camera property information, determines a position of interest or an object to be displayed based on the determined position and direction of the terminal, generates a virtual object, and composes the generated virtual object and an input image. Subsequently, the controller 110 displays a result of the composition through the display unit 160.

When the camera property information is not stored, the controller 110 transfers, to the camera property information providing server 200, a request message that requests the camera property information associated with the terminal 100. In this example, the request message includes a camera property search keyword, such as a model name of the terminal 100 or a model name of a camera included in the terminal 100, used for searching for the camera property information of the terminal 100 from among one or more pieces of camera property information stored in the camera property information providing server 200.

When a response message is received from the camera property information providing server 200 in response to the request message, the controller 110 determines whether the camera property information of the terminal 100 is included in the response message.

When the camera property information is included, the controller 110 stores, in the storage unit 170, the camera property information included in the received response message, and generates an augmented reality based on the stored camera property information.

When the camera property information is not included, the controller 110 generates an augmented reality based on common camera property information obtained by generalizing camera property information of all terminals.

The sensor unit 120 includes a position sensor 121 and a direction sensor 122, and the position sensor 121 detects a position of the terminal 100 and the direction sensor 122 detects a direction of the terminal 100. The detected result values may be transferred to the terminal posture estimator 140. As the position sensor 121 and the direction sensor 122, any position sensor and any direction sensor for detecting a position or a direction of a terminal may be used.

The camera unit 130 receives an optical signal, and outputs an image. More particularly, the camera unit 130 generates and outputs a preview image.

The terminal posture estimator 140 estimates a terminal posture associated with a place and a direction where the terminal 100 is positioned, based on the detected result values associated with the position and the direction of the terminal 100 and the image output from the camera unit 130.

The virtual object composition unit 150 composes the virtual object and the output image so that the virtual object is placed at an accurate position of an object included in the image output from the camera unit 130, based on the terminal posture estimated by the terminal posture estimator 140 and the stored camera property information.

The display unit 160 may be formed of a Liquid Crystal Display (LCD), and visually provides a user with a menu of a terminal, input data, function setting information, and various other information. The display unit 160 may be formed of various devices in addition to the LCD.

The storage unit 170 may store a signal or data input/output to correspond to operations of the controller 110, the sensor unit 120, the camera unit 130, the terminal posture estimator 140, the virtual object composition unit 150, and the display unit 160, based on a control of the controller 110. More particularly, the storage unit 170 may store camera property information associated with the camera included in the terminal 100, or may store, in advance, common camera property information obtained by generalizing camera property information of all terminals.

Figure 4:
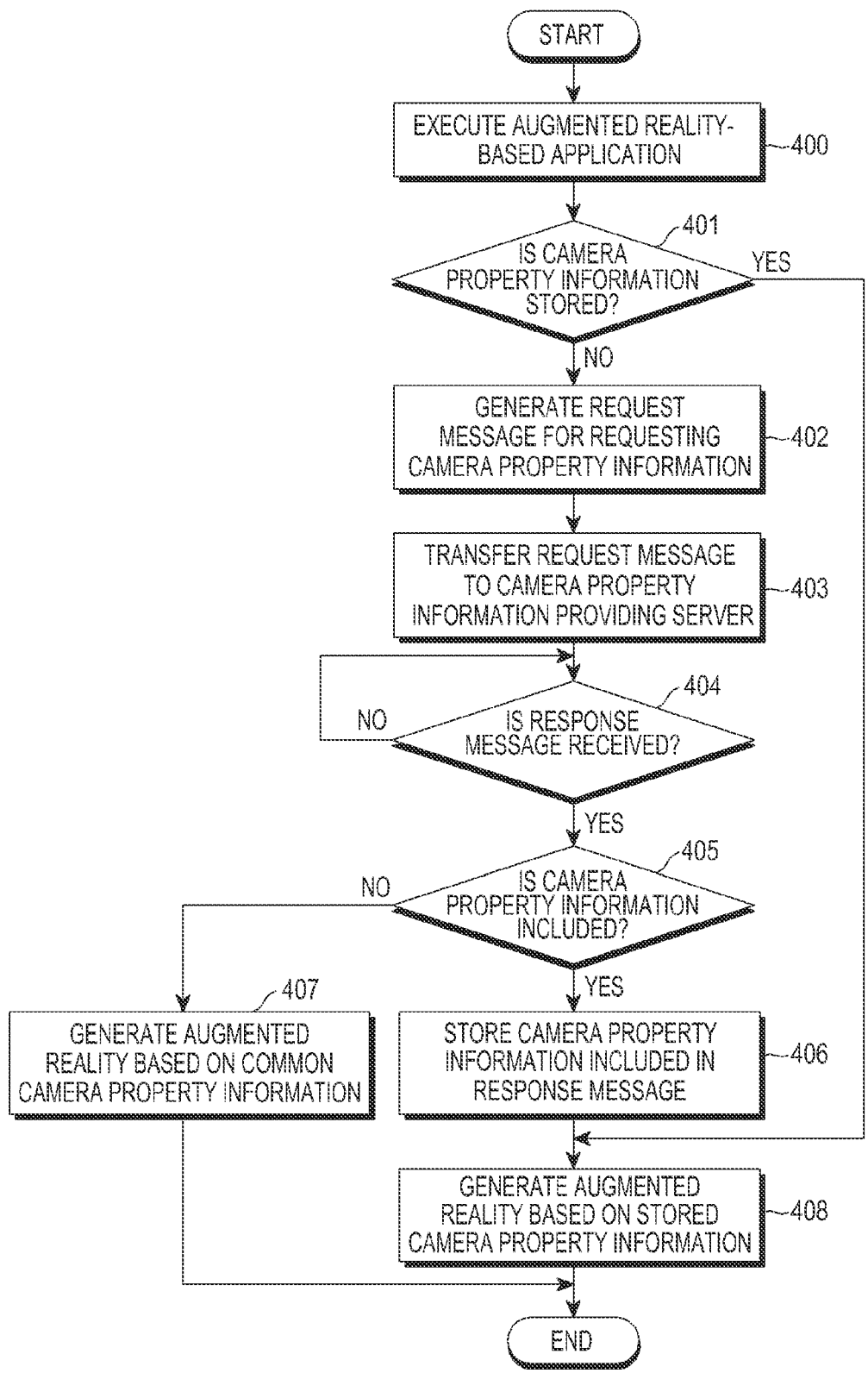
FIG. 4 is a flowchart illustrating a process in which a terminal generates an augmented reality through a camera property information providing server according to an embodiment of the present disclosure.

FIG. 4 is a flowchart illustrating a process in which a terminal generates an augmented reality through a camera property information providing server according to an embodiment of the present disclosure.

Referring to FIG. 4, in operation 400, the controller 110 executes an augmented reality-based application. More particularly, the controller 110 executes an augmented reality-based application, and drives the camera unit 130 and displays an image output from the camera unit 130. In addition, the controller 110 detects a position and a direction of a terminal through the sensor unit 120, and estimates a posture of the terminal through the terminal posture estimator 140, based on the detected position and direction of the terminal.

In operation 401, the controller 110 determines whether the camera property information associated with the terminal 100 is stored in the storage unit 170.

When the camera property information is stored, the controller 110 proceeds with operation 408, and generates an augmented reality based on the stored camera property information.

When the camera property information is not stored, the controller 110 proceeds with operation 402, and generates a request message for requesting camera property information corresponding to the terminal 100.

In operation 403, the controller 110 transfers the generated request message to the camera property information providing server 200. In this example, the request message includes a camera property search keyword for searching for the camera property information corresponding to the terminal 100.

In operation 404, the controller 110 determines whether a response message is received from the camera property information providing server 200 in response to the request message, and proceeds with operation 405 when the response message is received. When the response message is not received, the controller 110 continuously determines whether the response message is received from the camera property information providing server 200 in operation 404. According to another embodiment, when the response message is not received from the camera property information providing server 200, the controller 110 may generate an augmented reality based on common camera property information stored in advance in the storage unit 170.

In operation 405, the controller 110 determines whether camera property information associated with the terminal 100 is included in the received response message, and proceeds with operation 406 when the camera property information is included. When the camera property information is not included, the controller 110 generates an augmented reality based on the common camera property information stored in advance in the storage unit 170 in operation 407. For example, the response message may include information indicating that the camera property information associated with the terminal 100 is not included.

In operation 406, the controller 110 stores, in the storage unit 170, the camera property information associated with the terminal 100 included in the received response message.

In operation 408, the controller 110 generates an augmented reality based on the camera property information stored in the storage unit 170. More particularly, the controller 170 controls the virtual object composition unit 150 to compose a virtual object and an image output from the camera unit 130, based on the stored camera property information and the estimated posture of the terminal, and outputs a composed image through the display unit 160.

As described above, according to the present disclosure, a camera property information providing server configured to store camera property information associated with one or more terminals in advance may provide camera property information associated with a corresponding terminal in response to a request, and the corresponding terminal may provide an augmented reality in which an image output from a camera and a virtual object are accurately matched based on the provided camera property information.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read Only Memory (ROM), a Random Access Memory (RAM), Compact Disc (CD)-ROMs, magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

The above-described various embodiments of the disclosure may be embodied as hardware, software or a combination of hardware and software. Software may be stored in a volatile or non-volatile storage device, such as a ROM and the like irrespective of erasing or rewriting, a memory, such as a RAM, a memory chip, a device, and an integrated circuit, or a storage medium that is capable of performing optical or magnetic recording and machine-reading, such as a CD, a Digital Versatile Disc (DVD), an optical disc, a magnetic tape, and the like. The augmented-reality generating method may be embodied by a computer or a portable terminal which includes a controller and a memory, and the memory may be an example of machine-readable storage media that are suitable for storing a program including instructions to implement the various embodiments, or programs. Therefore, the disclosure may include a program including a code to implement an apparatus or a method claimed in a claim of the specification, and a non-transitory machine-readable storage medium including the program, for example, a non-transitory computer-readable storage medium. The program may be transferred electronically through a medium, such as a communication signal transferred through a wired or wireless connection, and the disclosure may appropriately include an equivalent medium.

In addition, the terminal for generating an augmented reality may receive a program from a program providing device that is wiredly or wirelessly connected, and may store the program. The program providing device may include a program including instructions to instruct the terminal to perform an augmented reality generating method, a memory storing information used for the augmented reality generating method and the like, a communication unit to perform wired or wireless communication with the terminal for generating an augmented reality, and a controller to transmit the program to the terminal for generating an augmented reality, automatically or in response to the request from the terminal for generating an augmented reality.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A terminal for generating an augmented reality, the terminal comprising:
   a sensor configured to detect a position or a direction associated with the terminal;
   a camera configured to output an image;
   a terminal posture estimator configured to estimate a posture of the terminal based on the position and the direction associated with the terminal detected by the sensor;
   a virtual object composition device configured to compose a virtual object and the image input by the camera; and
   a controller configured to:
      determine whether camera property information is stored when generating an augmented reality is requested,
      request camera property information of the terminal from a camera property information providing server when the camera property information is not stored, and
      compose the virtual object and the image based on the camera property information and the estimated posture when the requested camera property information is received.

2. The terminal of claim 1, wherein the camera property information includes at least one of a field of view in which the camera views the world and a focal length from a lens to a camera sensor.

3. The terminal of claim 1, wherein, when the camera property information is not stored, the controller is further configured to:
   generate a request message for requesting the camera property information of the terminal, and
   transfer the generated request message to the camera property information providing server.

4. The terminal of claim 3, wherein the request message includes a camera property search keyword used for searching for the camera property information of the terminal.

5. The terminal of claim 3, wherein, when a response message is received from the camera property information providing server in response to the request message, the controller is further configured to store the camera property information of the terminal included in the received response message.

6. The terminal of claim 1, wherein, when the camera property information is stored, the controller is further configured to compose the virtual object and the image based on the stored camera property information and the estimated posture.

7. The terminal of claim 1, wherein the camera property information providing server comprises:
   a camera property storage configured to store camera property information associated with one or more terminals; and
   a controller configured to:
      search for camera property information of a terminal corresponding to a camera property search keyword included in a request message, when the request message is received from the terminal,
      generate a response message including the retrieved camera property information of the terminal, and
      transfer the generated response message to the terminal.

8. The terminal of claim 7, wherein the controller of the camera property information providing server includes, in the response message, common camera property information obtained by generalizing camera property information of all terminals, and transfers the response message to the terminal, when the camera property information of the terminal corresponding to the camera property search keyword does not exist.

9. A method of generating an augmented reality in a terminal, the method comprising:
  detecting a position or a direction associated with the terminal when generating an augmented reality is requested;
  estimating a posture of the terminal based on the position and the direction associated with the terminal detected by a sensor;
  determining whether camera property information is stored;
  requesting the camera property information of the terminal from a camera property information providing server when the camera property information is not stored; and
  composing a virtual object and an image based on received camera property information and the estimated posture when the requested camera property information is received.

10. The method of claim 9, wherein the camera property information includes at least one of a field of view in which the camera views the world and a focal length from a lens to a camera sensor.

11. The method of claim 9, wherein the requesting of the camera property information of the terminal comprises:
  generating a request message to request the camera property information of the terminal when the camera property information is not stored; and
  transferring the generated request message to the camera property information providing server.

12. The method of claim 11, wherein the request message includes a camera property search keyword used for searching for the camera property information of the terminal.

13. The method of claim 9, further comprising:
  storing the camera property information of the terminal included in a received response message when the response message is received from the camera property information providing server in response to the request message.

14. The method of claim 9, further comprising:
  composing the virtual object and the image based on stored camera property information and the estimated posture when the camera property information is stored.

15. The method of claim 9, wherein the camera property information providing server comprises:
  a camera property storage configured to store camera property information associated with one or more terminals; and
  a controller configured to:
    search for camera property information of a terminal corresponding to a camera property search keyword included in a request message, when the request message is received from the terminal,
    generate a response message including the retrieved camera property information of the terminal, and
    transfer the response message to the terminal.

16. The method of claim 15, wherein the controller of the camera property information providing server includes, in the response message, common camera property information obtained by generalizing camera property information of all terminals, and transfers the response message to the terminal, when the camera property information of the terminal corresponding to the camera property search keyword does not exist.

17. A non-transitory processor readable medium for storing a computer program of instructions configured to be readable by at least one processor for instructing the at least one processor to execute a computer process for performing the method as recited in claim 1.

* * * * *